(12) United States Patent
Chen

(10) Patent No.: US 12,013,834 B1
(45) Date of Patent: Jun. 18, 2024

(54) DATABASE SYSTEM AND METHOD SUPPORTING PARALLEL UPDATE

(71) Applicant: Xiaofan Chen, Wuhan (CN)

(72) Inventor: Xiaofan Chen, Wuhan (CN)

( * ) Notice: Subject to any disclaimer, the term of this patent is extended or adjusted under 35 U.S.C. 154(b) by 0 days.

(21) Appl. No.: 18/316,024

(22) Filed: May 11, 2023

(30) Foreign Application Priority Data

Feb. 24, 2023 (CN) .......................... 202310166222.X

(51) Int. Cl.
*G06F 16/23* (2019.01)
*G06F 16/2455* (2019.01)

(52) U.S. Cl.
CPC ...... *G06F 16/2322* (2019.01); *G06F 16/2329* (2019.01); *G06F 16/24552* (2019.01)

(58) Field of Classification Search
CPC .............. G06F 16/2322; G06F 16/2329; G06F 16/24552
See application file for complete search history.

(56) References Cited

U.S. PATENT DOCUMENTS 10,585,876 B2 * 3/2020 Brodt .................. G06F 16/2365
11,886,422 B1 * 1/2024 Li ...................... G06F 16/2379

* cited by examiner

*Primary Examiner* — Etienne P Leroux
(74) *Attorney, Agent, or Firm* — Zhu Lehnhoff LLP

(57) ABSTRACT

A database system and method supporting parallel update includes: a concurrency control protocol, which caches max Read Timestamp, max Write Timestamp and max Normal Write Timestamp for each data item in the database; a write-ahead log module, which records normal logs and delta logs; a cache module, which caches normal records with the largest version number of the data item and all subsequent delta records; a persistence module, which saves the records in the cache to a persistent medium; a write control module, which controls the write operation, and which, if transaction timestamp is greater than the max Read Timestamp, determine and execute normal write and incremental write respectively and generate normal records and delta records, and update the max Write Timestamp and the max Normal Write Timestamp; and a read control module maintaining a dependency graph according to dependency between the write transaction and the read transaction.

20 Claims, 2 Drawing Sheets

DATABASE SYSTEM AND METHOD SUPPORTING PARALLEL UPDATE

REFERENCE TO RELATED APPLICATIONS

The present application claims the priority of Chinese patent application No. 202310166222.X filed on Feb. 24, 2023, the entire disclose of which is incorporated herein by reference.

FIELD OF THE INVENTION

The disclosure relates to the technical field of databases, in particular to a database system and method supporting parallel update.

BACKGROUND OF THE INVENTION

Concurrency control is a mechanism used to protect database integrity and ensure timely correction of errors caused by concurrent operations when multiple users execute write transactions at the same time. The basic unit of concurrency control is the transaction. An incorrect concurrency mechanism may lead to problems such as dirty reads, phantom reads, and non-repeatable reads. The purpose of concurrency control is to ensure that the work of one user does not unreasonably affect the work of another user. These measures ensure that when a user works at the same time with others, the results obtained are the same as when he is alone.

Traditionally, database systems use the following four methods to serialize conflicting concurrent transactions, (1) 2-phase locking, (2) protocols based on timestamps, typically represented by timestamp ordering protocols, (3) optimistic concurrency control, (4) allowing dirty reads, that is, allowing cascading rollbacks (such as rubatoDB, hyper, etc.); the first three methods only support concurrent update, but cannot support parallel update; although the fourth method supports parallel update, it has cascading scheduling, that is, cascading rollback is required, and cascading rollback is usually a bad design, because the rollback of one transaction may lead to the rollback of hundreds of subsequent transactions depending on the rollbacked transaction, which greatly affects the performance of the system and produces severe performance jitter.

Concurrent update means that concurrent transactions are handed over to the processor at different time points for processing. At the same time point, concurrent transactions will not run at the same time. Parallel update means that conflicting update transactions can be performed independently of each other. At the same time point, conflicting transactions can run in parallel.

In 2018, Microsoft Corporation proposed fasterKV, which can support parallel updates, but cannot guarantee ACID. ACID indicates four necessary characteristics of the database management system (DBMS) for ensuring transactions are correct and reliable in the process of writing or updating data, i.e., atomicity (or indivisibility), consistency, isolation (also known as independence), and durability. Therefore, fasterKV is not a database system in a strict sense, let alone a reliable database system that supports parallel updates. FasterKV can't support interactive transaction neither.

SUMMARY OF THE INVENTION

When dealing with concurrent transactions in the above-mentioned database system, some of the traditional solutions cannot support parallel updates, and some of them use dirty reads that need cascading rollbacks for parallel updates, which has a severe impact on database performance. The new solution fasterKV cannot guarantee ACID The present disclosure provides a database system and method that supports parallel updates, which, while supporting parallel updates, guarantees ACID and serializable isolation levels, and ensure there is no cascading between schedules, cascading rollback is not required, distributed transactions are supported, and interactive transactions are also supported In order to achieve the above object, the present disclosure provides a database system that supports parallel updates, including: a concurrency control protocol, a write-ahead log module, a cache module, a persistence module, a write control module, and a read control module;

The concurrency control protocol is configured to:
At the beginning of each transaction, obtain timestamp from time service as a version number of all subsequent records of the transaction;
For each data item Q that has been read in the database, cache the largest timestamp of all the transactions that have read the data item in memory as the max Read Timestamp; for range queries in the database, decompose the range into disjoint intervals, and cache timestamp of the largest transaction that has read these intervals in memory as the gap max Read Timestamp; and
For each data item Q in the database, cache the largest timestamp of all the transactions that have written or updated the data item and the largest timestamp of all the transactions that have written a normal record in the memory as the max Write Timestamp and the max Normal Write Timestamp, respectively;

The write-ahead log module is configured to:
Record logs in such two formats as normal log and delta log, the write-ahead log having to be saved to a durable medium synchronously;

The cache module is configured to:
Cache the normal record with the largest version number of the data items and all subsequent delta records in the cache module, and also buffer normal records and delta records written by the transactions in the cache module; normal records record specific and determined values, and delta records only record the incremental operation itself; incremental operations are limited to operations that can be expressed as functions that only accept this data item as an argument; update operation that cannot be expressed as functions that only accept this data item as an argument needs to be converted into read-modify-write operation and generate a normal record, and the read-modify-write operation does not support parallel updates; the cache module supports quick lookup of all cached records according to data item's primary key and version number;

The persistence module is configured to:
Save the records in the cache to the persistent medium asynchronously, and the persistence module also supports quick lookup of database records according to the data item's primary key and version number;

The write control module is configured to:
Determine the timestamp of the transaction that writes the data item, wherein if the timestamp is smaller than the max Read Timestamp of the data item cached in memory, rollback the transaction, and otherwise perform write operations for normal write operations and incremental update operations:

For the normal write operations of the data items, further determine whether the timestamp of the transaction writing the data item is smaller than the max Write Timestamp of the data item cached in the memory; if yes, rollback the transaction; and if no, update the max Write Timestamp and the max Normal Write Timestamp, and generate normal logs and normal records; and For the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and Each said normal record or delta record constitutes a Writer object respectively, the Writer corresponding to the normal record is called a normal Writer, the Writer corresponding to the delta record is called a delta Writer, and value of the Writer is the corresponding normal or delta record; and the timestamp of Writer is the timestamp of the transaction; and The read control module is configured to:

Generate a Reader object according to the transaction reading the data item, the timestamp of Reader object is the timestamp of the transaction;

For the data item to be read by the Reader object, try to obtain the last normal record and all subsequent delta records of which the timestamps are smaller than the timestamp of Reader object from the cache module; in case of cache-miss, load the last normal record of which the timestamp is smaller than the timestamp of the Reader object and all subsequent records from the persistence module into the cache then retry read;

Maintain a dependency graph of the Reader object according to dependency relationship between the transaction of reading data items and the transaction of writing the data items and based on the last normal record and all subsequent delta records of which the timestamps are smaller than the timestamp of Reader object; and Execute the Reader object after executions of all the Writer objects corresponding to the normal record and all subsequent delta records in the dependency graph are completed; and The Reader object merges values of all the Writer objects it depends on from the dependency graph to obtain the value of the data item to be read, and atomically updates the max Read Timestamp.

As a further improvement of the present disclosure, maintaining a dependency graph of the Reader object according to dependency relationship between the transaction of reading data items and the transaction of writing the data items and based on the last normal record and all subsequent delta records includes:

All edges of the dependency graph start from a Writer object and end with a Reader object.

As a further improvement of the present disclosure, maintaining a dependency graph of the Reader object based on the last normal record and all subsequent delta records includes:

After the dependency graph of the Reader object is established, updating the dependency graph of the Reader object if there is arrival of a transaction to write a new record for the data item to be read by the Reader object; and Updating the dependency graph of all data items written by the transaction when a transaction is rollbacked.

As a further improvement of the present disclosure, it also includes a dependency graph optimization module for fusing delta records regularly and quantitatively, including:

When the transactions corresponding to the normal records of the data item and the subsequent continuous delta records have been committed, fuse all the above records and generate a new normal record; the new normal record adopts the version number of the last delta record, and updates the max Normal Write Timestamp; and at the same time, the fused record is saved to the persistence module and all previous records are deleted from the cache.

As a further improvement of the present disclosure, it also includes a dependency graph optimization module, which is configured to:

After the transaction of reading data items generates a Reader object r, correspondingly generate a placeholder transaction, which includes a Reader/Writer pair, wherein the Writer is a normal Writer, and make timestamp of the placeholder be the version number of the last Writer object smaller than r plus one; generate a dependency graph for the Reader of the placeholder transaction; subsequent transactions that read this data item and have a timestamp greater than the version number of the Reader in the placeholder transaction only need to depend on the Writer of the placeholder transaction; when execution of the Reader object of the placeholder transaction is completed, replace the value of the Writer corresponding to the placeholder transaction with the read value, and commit the placeholder transaction.

As a further improvement of the present disclosure, it also includes a constraining update and conditional update module;

The constraining update and conditional update module is configured to:

For update of data items with constraints, when the transaction of writing the data items is an incremental update operation, calculate a range of the data item after the current incremental update operation, and determine whether there is an intersection with the constraint range; if no intersection, it proves that the incremental update operation is illegal, and the transaction shall be rollbacked; otherwise, further determine whether it is a subset of the constraint range; if yes, it proves that the operation must be legal, and execution of the transaction is continued to complete incremental update of the data item with the constraint condition; otherwise, the operation will be converted into a read-modify-write operation, and parallel update is no longer possible;

For update of data items with conditions, when the transaction of writing the data items is an incremental update operation, calculate a domain of the data item before the current incremental update operation, and determine whether there is an intersection with the update condition; if no intersection, it proves that the incremental update operation is illegal, and the transaction shall be rollbacked; otherwise, further determine whether it is a subset of the update conditions; if yes, it proves that the operation must be legal, and execution of the transaction can be continued; otherwise, the operation will be converted into a read-modify-write operation, and parallel update is no longer possible.

As a further improvement of the present disclosure, the method for defining and updating the domain and the range includes:

Assuming that the initial committed value of the data item Q is v, the range of the data item is [v, v], which is recorded as $range_Q$, and the domain is also [v, v], which is recorded as $domain_Q$;

For each incremental update operation Delta Writer w, w·f represents the function corresponding to the update operation of w, then:

$$range_Q = w \cdot f \cdot map(domain_Q)$$

$$domain'_Q = domain_Q \cup range_Q$$

By default, for the updates of the range and the domain, updates should be performed in the order of transaction timestamps; and updates can be performed out of order if the update operations are independent of order and don't contain any conditional update; and if updates are performed out of order, conditional updates should be converted to read-modify-write operations.

As a further improvement of the present disclosure, it also includes an index update module;

The index update module is configured to:

When there is a unique index on an update column of an updated data item, update operation needs to be converted into a read-modify-write operation, and parallel updates cannot be performed;

When there is a non-unique index on the update column of the updated data item, parallel updates can still be performed at this time, with a method of:

Creating a non-unique index entry while updating a data item, which non-unique index entry includes:

A primary key column, encoded as: index name-index value-primary key value of the indexed data item-transaction version number, wherein the index value is value of an index column, and the transaction version number is the transaction version number that creates the index; a non-primary key column, recording metadata information of the index entry, which is called index metadata column;

For data items of delta records, the index value is set to be undefined, and the value of the index metadata column is the range of the data item, which is calculated the same as 044,045,045 and in the order of transaction timestamps; for index entry of normal records, the index value is a definite value, and the index metadata column is empty; and For the query using the index indexed_column∈C, setting timestamp of the query transaction as $TS_q$, first update gap max Read Timestamp of the query condition C∪{undefined}; then scan the index entry whose index value is not undefined, and add the index entry that meet query conditions and transaction visibility to a result set R; then scan the index entry whose index value is undefined, first determine whether the visibility is satisfied, and if not, skip the index entry, and if yes, continue to determine relationship between the range of the index entry and the query condition set; if there is no intersection between the range of the index entry and the query condition, skip the data item; otherwise, if the range of the index entry is a subset of the query condition set, add the index entry to the result set R; otherwise, a Reader object needs to be registered for the data item corresponding to the primary key of the indexed data item; the timestamp of the Reader object is set to the version number of writing the index entry, and a read process is executed to the Reader; after the execution, the index value of the index entry is the value read by the Reader, which can be compared with the query condition; if not satisfied, skip; otherwise, add it to the result set R.

As a further improvement of the present disclosure, the process of converting an update operation into a read-modify-write operation is as follows: first register a Reader and a placeholder Writer using the current transaction timestamp as its version number, execute the read process to obtain the value of the current data item, apply the update operation, and replace the value in the placeholder Writer with the updated value and execute the write process.

As a further improvement of the present disclosure, the index update module is also configured to clean up indexes with undefined values, including:

When there are too many indexes with undefined value in the system, query performance will be significantly slowed down, and the indexes with undefined value need to be cleaned up regularly, with a method as follows:

Scanning indexes with undefined value, and, for each index, registering a Reader object for the data item corresponding to the primary key and version number of the indexed data item, and executing the Reader object, and creating a new index entry using the read value; and after the creation is completed, deleting the corresponding index entry with undefined value.

The present disclosure also provides a method for a database system supporting parallel update, including: a write transaction concurrency control method and a read transaction concurrency control method;

The write transaction concurrency control method includes:

At the beginning of each transaction, obtaining timestamp from time service as version number of subsequent records of each transaction;

If the timestamp of the transaction is smaller than the max Read Timestamp, rollback the transaction, otherwise execute write operation respectively for normal write operations and incremental update operations:

For the normal write operations of the data items, further determine whether the timestamp of the transaction writing the data item is smaller than the max Write Timestamp of the data item cached in the memory; if yes, rollback the transaction; and if no, update the max Write Timestamp and the max Normal Write Timestamp, and generate normal logs and normal records; and For the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and The read transaction concurrency control method includes:

At the beginning of each transaction, obtaining timestamp from time service as version number of subsequent records of each transaction;

Generating a Reader object for each data item read by the transaction;

For the data item to be read by the Reader object the transaction, try to obtain the last normal record and all subsequent delta records of which the timestamps are smaller than the transaction timestamp of Reader object from the cache module; if the cache misses, load the last normal record of which the timestamp is smaller than the timestamp of the Reader object and all subsequent records from the persistence module into the cache then retry reading from cache;

Maintaining a dependency graph of the Reader object according to dependency relationship between the transaction of reading data items and the transaction of writing the data items and based on the last normal record and all subsequent delta records; and Executing the Reader object when the last normal record and all subsequent delta records in the dependency graph are committed; and Obtaining the value of the data item to be read by the Reader by merging from the dependency graph with values of all the Writer objects that the Reader depends on, and atomically updating the max Read Timestamp.

Compared with prior art, the present disclosure brings about the following beneficial effect:

Compared with the traditional database where all update operations must be executed serially and the time required to complete 1000 incremental update transactions is at least 1000*rtt while rtt is the round trip time of database replication, the present disclosure designs data records in two different formats and carefully designs a concurrency control system, so that the concurrency control protocol does not have to deal with incremental write conflicts, multiple incremental update transactions can be processed in parallel, by which only 1 rtt is required to complete 1000 incremental update transactions, significantly improving the throughput and delay of the database in concurrent update scenarios, and increasing the performance in the concurrent update scenarios by thousands of times than the traditional databases.

The present disclosure ensures that the read transaction can read all write records smaller than the read transaction by maintaining the Writer→Reader dependency graph, and atomically update the timestamp of the largest transaction of the data item after all the Writers that the Reader depends on are committed, thereby guaranteeing serialization of the schedules;

The present disclosure realizes serializable isolation level without cascading rollback.

The present disclosure can greatly reduce the number of edges in the dependency graph by introducing a placeholder transaction, improving processing efficiency.

The disclosure supports parallel updates of data items with constraints and indexes.

The disclosure supports pessimistic concurrency control for read-modify-write operations by registering a placeholder writer in the read phase.

DETAILED DESCRIPTION OF THE INVENTION

In order to make the object, technical solutions and advantages of the embodiments of the present disclosure clearer, the technical solutions in the embodiments of the present disclosure will be clearly and completely described below with reference to the drawings in the embodiments of the present disclosure. Obviously, the described embodiments are part, rather than all, of embodiments of the present disclosure. Based on the embodiments of the present disclosure, all other embodiments obtained by those ordinarily skilled in the art without making creative efforts fall into the protection scope of the present disclosure.

The present disclosure is described in further detail below with reference to the accompanying drawings.

Figure 1:
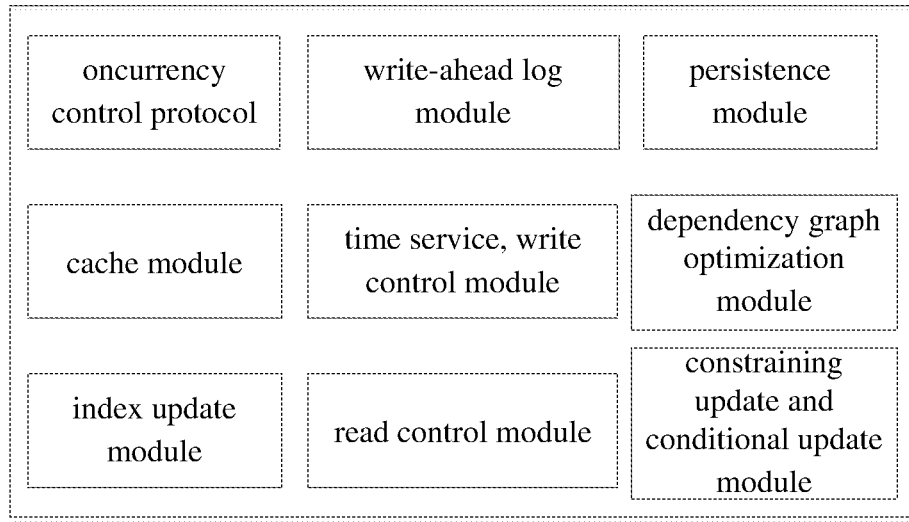
FIG. 1 is a schematic diagram of a database system supporting parallel updates disclosed by an embodiment of the present disclosure.

As shown in FIG. 1, a database system supporting parallel updates provided by the present disclosure includes: a concurrency control protocol, a time service, a write-ahead log module, a cache module, a persistence module, a write control module, a read control module, a dependency graph optimization module and a constraining/conditional update module;

(1) The concurrency control protocol is configured to:

At the beginning of each transaction, make control to obtain timestamp from time service (the time service can use a centralized timestamp server, and also TrueTime or HLC could be used as the time service) as a version number of all subsequent records of the transaction;

For each data item Q that has been read in the database, cache timestamp of the largest transaction that has read the data item in memory as the max Read Timestamp; for range queries in the database, decompose the range into disjoint intervals, and cache timestamp of the largest transaction that has read these intervals in memory as the gap max Read Timestamp; and For each written data item in the database, cache timestamp of the largest transaction that has written the data item and timestamp of the largest transaction that has written normal records of the data item in the memory as the max Write Timestamp and the max Normal Write Timestamp, respectively.

(2) The write-ahead log module is configured to:

Record logs in such two formats as normal log and delta log, the write-ahead log having to be saved to a durable medium synchronously. The write-ahead log can use technologies such as group commit to improve the throughput of the system.

(3) The cache module is configured to:

Cache the normal record with the largest version number of the data items and all subsequent delta records in the memory, and also buffer normal record and delta record written by the transaction in the cache module, and generate a Writer object corresponding to each normal record or delta record, respectively; normal records record specific and determined values, and delta records only record the incremental operation itself; incremental operations are limited to operations that can be expressed as functions that only accept this data item as an argument, e.g., $f(q)=q+1$, $f(q)=q*q$, $f(q)=q-1$ if $q>1$ else $q$, etc.; update operation that cannot be expressed as functions that only accept this data item as an argument needs to be converted into normal records by read-modify-write operation; the cache module supports quick lookup of all cached records according to data item primary key and version number; the cache module can use data structures such as red-black tree or skiplist.

Figure 2:
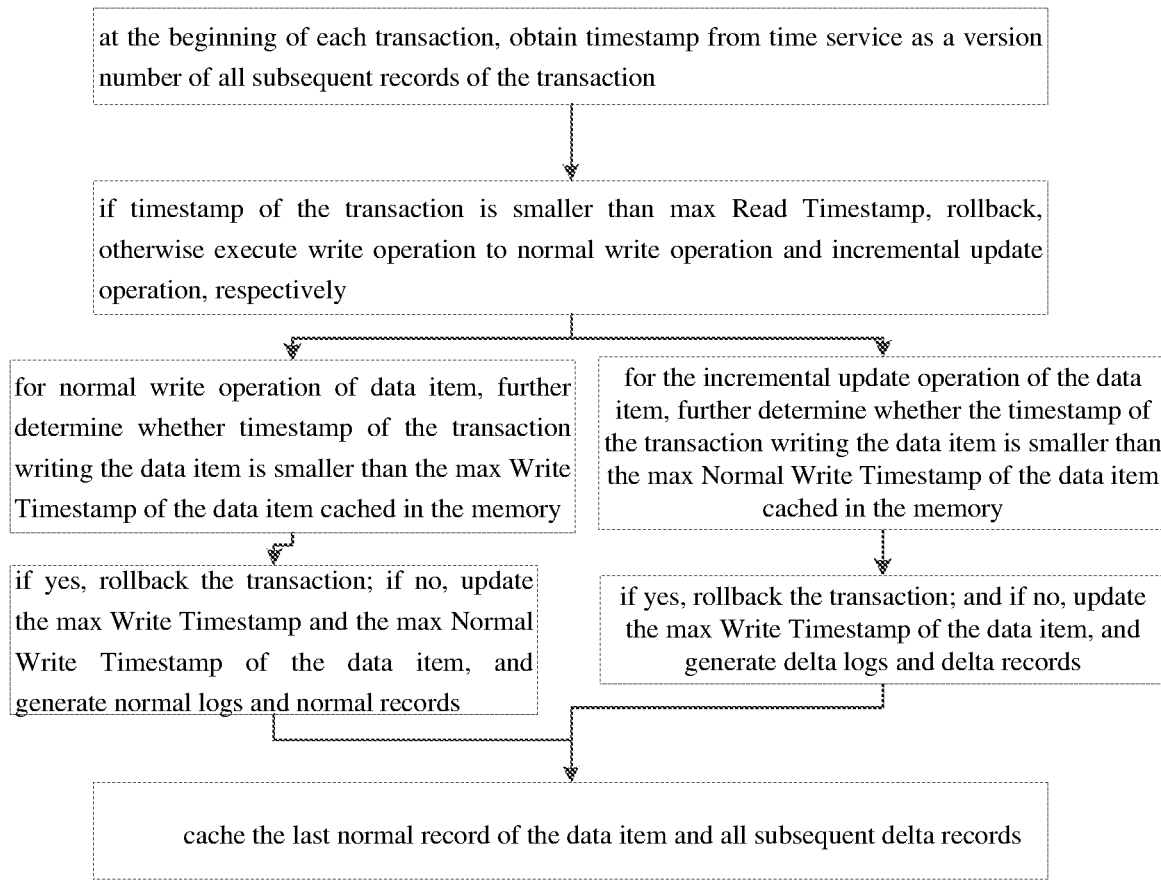
FIG. 2 is a flow chart of a method for concurrently controlling write transactions disclosed in an embodiment of the present disclosure.

(4) The persistence module is configured to:

Save the records in the cache to the persistent medium (such as HDD, SSD, etc.) asynchronously, and the persistence module can use B-tree or LSM-tree, etc.;

(5) The write control module, as shown in FIG. 2, is configured to:

Determine a timestamp of the transaction that writes the data item, wherein if the timestamp is smaller than the max Read Timestamp of the data item cached in memory, rollback the transaction, and otherwise perform write operations, including:

Normal write operations on data items, such as: UPDATE store SET v=123 WHERE pk=1 or INSERT INTO STORE (pk, v) VALUES (1, 123); no need to perform cache preloading, but need to further determine whether the timestamp of the transaction writing the data item is smaller than the max Write Timestamp of the data item cached in memory, and if smaller, rollback the transaction, and otherwise update the max Write Timestamp of the data item and the max Normal Write Timestamp; and generate log records (WAL log) and normal records;

Incremental update operations on data items, for example: UPDATE t SET v=v+1, if the data item exists in the cache, no cache preloading is required, and otherwise, the data item is preloaded from the persistent medium, and then it is necessary to further determine whether the timestamp of the transaction writing the data item is smaller than the max Normal Write Timestamp of the data item cached in the memory, and if smaller, rollback the transaction to avoid writing an expired data, and otherwise update the max Write Timestamp of the data item, and complete the incremental update operation on the data item, and generate delta records and logs. The delta records represent the update action itself, that is, f(x). In the above example, the delta record can be expressed as ADD 1;

wherein,

Rollback a transaction includes delete all data items written by the transaction, and meanwhile update dependency graphs of all data items written by the transaction;

In addition to directly rollbacking the transaction, it is also possible not to rollback the transaction, but to push up the transaction version number, and recheck the validity of all previous read results. If any read result is no longer valid, rollback the transaction; otherwise, can continue the transaction;

When the data item is preloaded from the persistent medium, if the data item does not exist in the persistent medium, throw a NotExists error. If the data item exists in the persistent medium, load the last normal version and the subsequent versions into memory.

Caching the last normal record of each data item and all subsequent delta records in the memory, and generating a Writer object corresponding to each normal record or delta record, a Normal Writer is generated correspondingly to the normal record, and a Delta Writer is generated correspondingly to a delta record;

wherein,

The Writer object contains transaction id, value information and metadata, which metadata includes dirty data and committed data, and the Writer object is also divided into Normal Writer and Delta Writer;

further,

When all data items in a transaction are written, the transaction will write a transaction record; at the same time, each data item written by the transaction contains a pointer to the transaction record; when the transaction record and all data items written by the transaction are successfully replicated (consistency protocols such as paxos/raft can be used), the normal records or delta records generated by the operation of the transaction writing data items can be regarded as committed data; after the commit process is completed, it will enter an asynchronous cleaning process, modifying the metadata of the data items written by the transaction, and changing the dirty data flag to "committed". Before completion of the asynchronous cleaning process, if other transactions read the dirty data item, the transaction record could be enquired to obtain commit status of the transaction;

It would be shown as dirty data before being taken as committed data;

When a transaction is committed, it will check all the data items written by the transaction and update the dependency graph. If all the dependent write transactions of a Reader that depends on the transaction are committed, the Reader can be fired (triggered).

Specific examples are as follows:

T0 is a non-look-write transaction, as follows:

T0: BEGIN; INSERT INTO store (pk, v) VALUES (1, 123); COMMIT;

After T0 is successfully executed, two concurrent transactions T1 and T2 enter the system T1: BEGIN; UPDATE t SET v=v+1 WHERE pk=1;

T1: BEGIN; UPDATE t SET v=v+2 WHERE pk=1;

Since the above two transactions have not yet been committed, the transaction is in the pending (waiting) state at this time;

In this database system, the following WAL will be generated:

(T0, 1, 123) (normal records)

(T1, 1, +1), the + sign represents a delta record (T2, 1, +2)

The records in the database cache will contain the following three versions

| Version | Value   | Metadata                    |
|---------|---------|-----------------------------|
| 0       | (v: 123)| committed (committed data)  |
| 1       | (v: +1) | uncommitted (dirty data)    |
| 2       | (v: +2) | uncommitted (dirty data)    |

The last normal record (non-delta)+all subsequent delta records can be cached in memory.

In the above three versions, after the record (v: 123) is successfully written:

(1) the method of updating the max Write Timestamp of the data item is:

maxWriteTimestamp=max(maxWriteTimestamp, TS(Writer)

Then maxWriteTimestamp will be updated to 0;

(2) updating the max Normal Write Timestamp of the data item:

maxNormalWriteTimestamp is 0.

In the above three versions, after the record (v:+2) is successfully written, there is no need to update the max Normal Write Timestamp, and the method of only updating the max Write Timestamp of the data item is:

maxWriteTimestamp=max(maxWriteTimestamp, TS(Writer)

Then maxWriteTimestamp will be updated to 2; and maxNormalWriteTimestamp is unchanged (still 0).

Figure 3:
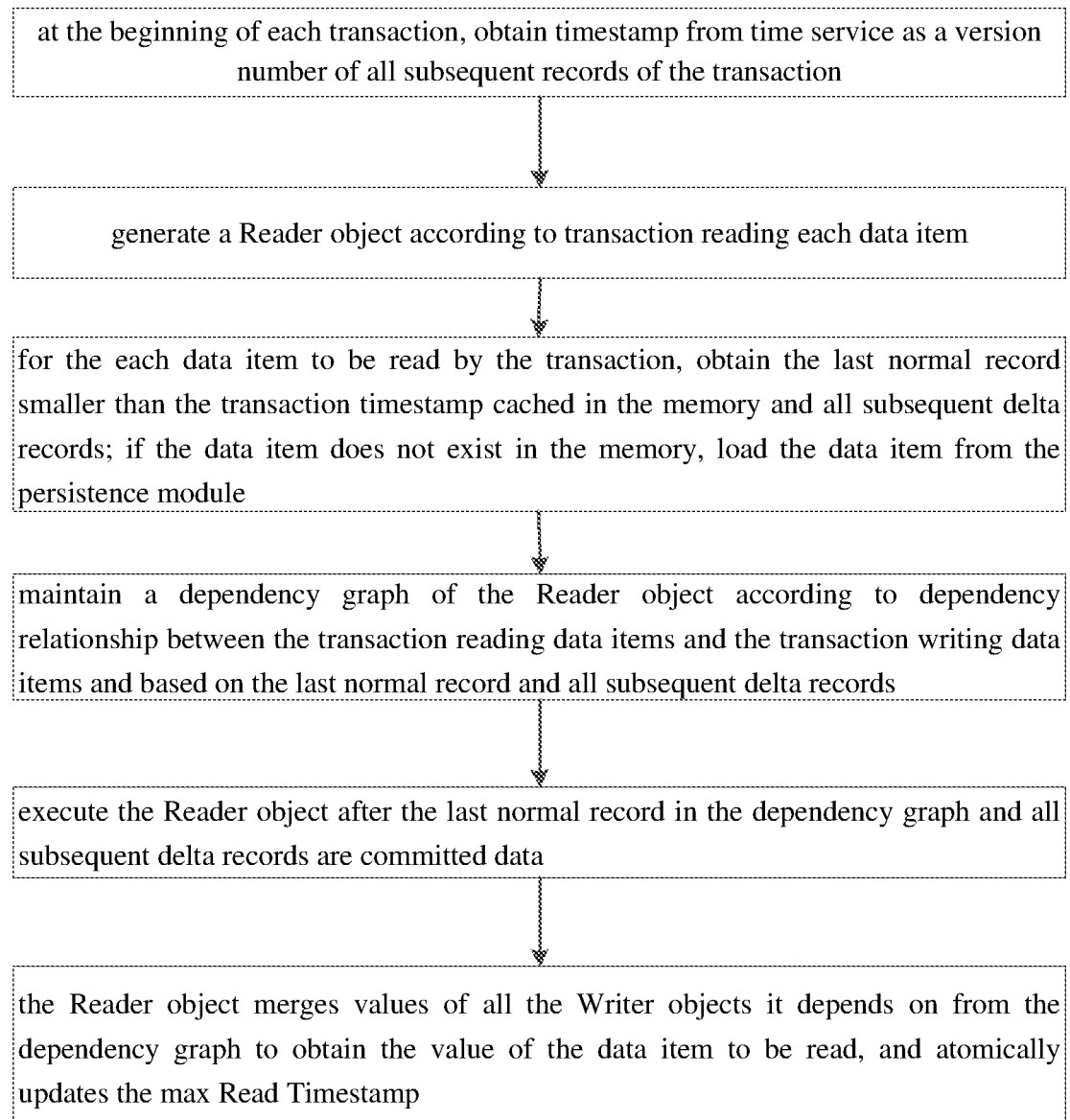
FIG. 3 is a flow chart of a method for controlling concurrency of read transactions disclosed by an embodiment of the present disclosure.

(6) The read control module, as shown in FIG. 3, is configured to:

Generate a Reader object according to the transaction reading the data item, including information such as the transaction version number;

Corresponding to the data item to be read by the transaction, obtain the last normal record and all subsequent delta records cached in memory that are smaller than the transaction timestamp;

Maintain a dependency graph of the Reader object according to dependency relationship between the transaction of reading data items and the transaction of writing data items and based on the last normal record and all subsequent delta records, which process is also called registering the Reader; meanwhile, if the transaction is a high-priority transaction, the max Read Timestamp will be updated when the Reader is registered and the update logic is: maxReadTimestamp=max (maxReadTimestamp, TS(Reader)), and if the transaction is a non-high-priority transaction, no update will occur;

When the Writer object corresponding to the last normal record in the dependency graph and all subsequent delta records are committed, the Reader object is executed; the value of the Reader can be read directly from the dependency graph by merging the values of all dependent and committed Writer objects; if the Reader is not a high-priority Reader, the maxReadTimestamp of the data item should be updated atomically, and the update logic is: maxReadTimestamp=max(maxReadTimestamp, TS(Reader)).

wherein,

Each normal record or delta record constitutes a Writer object; all edges of the dependency graph start from a Writer object and end with a Reader object.

Dependency graph preservation is bidirectional, that is, each Reader will record all the Writers it depends on, and each Writer will record all the Readers that depend on it.

Specifically,

For example, assuming that the version number of the read transaction is 4, the generated dependency graph is:

W0→R4
W1→R4
W2→R4

Further,

After the dependency graph of the Reader object is established, if a new transaction writing the data item arrives, the dependency graph of the Reader object needs to be updated, including:

If the Writer arrived is a Normal Writer (denoted as $W_{normal}$), record the Writer's timestamp as $TS(W_{normal})$, then find the largest Writer smaller than $TS(W_{normal})$; if there is no such Writer, it means that no Reader will depend on $W_{normal}$, and the dependency graph does not need to be updated; if such a Writer exists, record it as $W_{floor}$, find all Readers that depend on $W_{floor}$, and for each Reader R, delete all the dependencies of R before $W_{floor}$ (including $W_{floor}$ itself), and add a new dependency item $W_{normal}$→R;

If the Writer arrived is a Delta Writer (denoted as $W_{delta}$), record the Writer's timestamp as $TS(W_{delta})$, then find the largest Writer smaller than $TS(W_{delta})$; if there is no such Writer, it means that no Reader will depend on $TS(W_{delta})$, and the dependency graph does not need to be updated; if such a Writer exists, record it as $W_{floor}$, find all Readers that depend on $W_{floor}$, and for each Reader R, add a new dependency item $W_{delta}$→R.

If the transaction is rollbacked, all Writer-related dependency graphs of the transaction need to be updated. The specific method is, for each Writer:

a. If the Writer is a Delta Writer, delete the Writer from the dependency graph of all Readers that depend on the Writer.

b. If the Writer is a Normal Writer, the dependency graph of all Readers that depend on the Writer needs to be recalculated.

(7) The dependency graph optimization module is configured to optimize the number of edges;

In a high-concurrency scenario, if there are many incremental versions and many Readers at the same time, the number of edges in the dependency graph will expand dramatically. By optimizing the number of edges in the dependency graph, transaction processing efficiency can be improved, including:

1) Regularly and quantitatively fuse delta records: when the transactions corresponding to the committed normal records of a data item and all subsequent delta records have been committed, all delta records will be fused and a new normal record will be generated; and the new normal record takes the version number of the last delta record.

2) Generate and apply placeholder transaction: when a Reader object r is generated by a read transaction, a placeholder transaction is correspondingly generated. The placeholder transaction contains a Reader/Writer pair (the Writer is a normal Writer), and the timestamp of the placeholder transaction is made by the version number of the last Writer object that is smaller than r plus one; a dependency graph is generated for the placeholder Reader; subsequent transactions that read the data item and have a timestamp greater than the version number of the placeholder Reader only need to depend on the placeholder Writer; when execution of the placeholder Reader object is completed, the value of the Writer corresponding to the placeholder transaction is placed with the read value, and the placeholder transaction is committed.

The present disclosure also sets an interval of the time service generating timestamps to ensure that the version number of the placeholder transaction is different from the version number of any real transaction, for example, if the interval of the timestamps is set to 2, the version number of the real transaction will always be an even number, and the version number of the placeholder transaction is the version number of the real transaction (the version number of the Writer object) plus one, which is always an odd number and does not conflict with the version number of the real transaction.

Here is an example below:

Dependency Graph Before Optimization:

①W0→R8
W2→R8
W4→R8
②W0→R10
W2→R10
W4→R10

Dependency graph optimized with placeholder transactions (the generated placeholder transaction is T5, including R5 and W5 read-write pairs):

①W0→R5
W2→R5
W4→R5
②W5→R8
W5→R10

It can be seen the number of the edges is reduced.

Generally, if there are w delta version numbers and r readers, the dependency graph before the optimization will have w*r edges, and the dependency graph before the optimization will only have w+r edges.

3) The system maintains a closed timestamp, and all write transactions smaller than the closed timestamp will fail and retry. Then when the dependency graph is generated, all consecutive committed Writers smaller than the closed timestamp can be merged, and the last committed Delta Writer can be converted into a Normal Writer.

4) Define a new isolation level: traditionally, read committed is used as a transaction isolation level, and it is necessary to ensure that all committed transactions are read; the present disclosure proposes such a new isolation level as read-continuously-committed. Under this isolation level, it is only necessary to read all the last committed normal records and all subsequent consecutive committed delta records. For parallel update conditions, the workload of the reads is greatly reduced, and work efficiency is improved (it should be noted that this isolation level is limited to read-only transactions and scenarios that do not require strongread consistency). For example:

| Version | Value | Metadata |
|---------|-------|----------|
| 0 | 123 | committed |
| 1 | +1 | committed |
| 2 | +2 | uncommitted (dirty data) |
| 3 | +3 | committed |

Although version 3 has been committed, under the read-continuously-committed isolation level, transaction T5 (timestamp 5) will read the records written by T0 and T1, that is, 124. All reads under this isolation level are non-blocking reads.

(8) Constraining update and conditional update module

Constraining update refers to the update of data items with constraints, such as create table store (inventory integer not null, constraint v check (inventory>=0));

Conditional update refers to the update of data items with where conditions, such as update store set v=v−1 where v>=1;

When a delta record is written to a data item, it is impossible to determine whether the update condition is satisfied because the value of the data item is not read, and the update cannot be completed by the parallel update method described above.

1) For data items with constraints, when the transaction of writing data items is an incremental update operation, calculate the range of the data item after the current Delta Writer incremental update operation, and determine whether there is an intersection with the constraint range; if no intersection, it proves that the incremental update operation is illegal, and the transaction needs to be rollbacked; otherwise, further determine whether it is a subset of the constraint range, and if yes, it proves that the operation must be legal, and the transaction can continue to be executed; otherwise, the operation will be converted into a read-modify-write operation, and parallel updates cannot be performed.

The update method of domain and range is as follows:

Assuming that the initial committed value of the data item is v, the valuing range (range) of the data item is [v, v], recorded as $range_Q$, and the domain is also [v, v], recorded as $domain_Q$.

For each Delta Writer w, w·f represents the function corresponding to the update operation of w, then:

$$range_Q = w \cdot f \cdot map(domain_Q)$$

$$domain'_Q = domain_Q \cup range_Q$$

(Because if the Delta Writer is committed, $domain'_Q = range_Q$; if the Delta Writer rolls back, $domain'_Q = domain_Q$ remains unchanged)

In practical applications, the union operation can be simplified by a relaxed union, that is, it is only necessary to find any $domain''_Q$ such that $domain_Q \cup range_Q \subseteq domain''_Q$.

For example:

The initial value of inventory of a store with id 1 is 10, and the inventory constraint is that the value cannot be negative, that is, the constraint is inventory∈[0, ∞);

Now there are three concurrent transactions, assuming TS(T1)<TS(T2)<TS(T3) and the three transactions arrive in order of timestamp.

T1: update store set inventory=inventory−5 where id=1

T2: update store set inventory=inventory−11 where id=1

T3: update store set inventory=inventory−6 where id=1

When T1 is written but not committed, the range of the inventory becomes [5, 5], and [5, 5] is a subset of the constraint range [0, □), so the operation is legal. The domain becomes [10, 10]∪[5, 5]=[5, 10];

When T2 intends to write, calculate the range of the inventory, finding the range becomes [−6, −1], which has no intersection with the constraint range [0, ∞), so the operation is illegal and the transaction should be rollbacked;

When T3 intends to write, the range becomes [−1, 4], which intersects with the constraint range [0, ∞) but is not a subset of the constraint range, so it cannot be determined whether the operation is legal, and it should be degenerated into read-modify-write operation.

2) For an update with a where condition, when the transaction writing a data item is an incremental update operation, calculate the domain of the data item before the current incremental update operation, and determine whether there is an intersection with the update condition, if not, it proves that the incremental update operation is illegal, and the transaction needs to be rollbacked; otherwise, further determine whether it is a subset of the update conditions, and if yes, it proves that the operation must be legal, and the transaction can be continued, and otherwise the operation will be converted into a read-modify-write operation, and it is impossible to perform parallel update any longer.

For example:

The initial value of inventory of a store with id 1 is 10, and this table has no constraints.

Now there are three concurrent transactions, assuming TS(T1)<TS(T2)<TS(T3) and the three transactions arrive in order of timestamp.

T1: update store set inventory=inventory−5 where id=1 and inventory>=5

T2: update store set inventory=inventory−11 where id=1 and inventory>=11

T3: update store set inventory=inventory−6 where id=1 and inventory>=6

When T1 is executed, the domain is [10, 10], which is a subset of the update condition [5, ∞), so the operation is legal. After the transaction statement is executed, the range of the inventory becomes [5, 5], and the domain becomes [10, 10]∪[5, 5]=[5, 10];

T2 intends to write, but the domain [5, 10] has no intersection with the update condition [11, ∞), so the operation is illegal and the transaction should be roll-backed;

T3 intends to write, but the domain [5, 10] and the condition set [6, ∞) have an intersection but are not a subset of the condition set, so it cannot be determined whether the operation is legal, and it shall be degenerated into a read-modify-write operation.

By default, the updates of the range and domain should be performed in the order of the transaction timestamp, but if the update operation is an order-independent function (for example: addition operation) and conditional incremental updates are absent, out-of-order updates can be allowed. In the above example 0198, if the order of arrival is T3→T2→T1, the algorithm is still guaranteed to be correct, because the above three transactions are addition operations, which are order independent, and allowing out-of-order updates can help reduce the probability of rollback.

In general, if an operation satisfies commutative and associative laws at the same time (that is, the operation forms an Abelian group), the operation is order-independent. For example, both pure addition and pure multiplication are order-independent, but mixing addition and multiplication, in general, is not order-independent (but operations of the form $f(x)=(m+1)x-m$ are still order-independent).

When using the system of the present disclosure, it is possible to define an allowed order-independent update operation, such as addition, for a particular column of a table in the database. Order-independent update operation allows out-of-order updates of domains and ranges. But for order-dependent updates, out-of-order updates are not allowed. A simple implementation is that, for order-dependent updates, if $TS(w)<maxWriteTimestamp$, the transaction is rollbacked.

(9) Index update module

When there is an index on the column of the updated data item, an index entry needs to be created while updating the data item, but to create an index, generally speaking, the value of the index entry needs to be determined. However, in this concurrency control algorithm, after the incremental update operation is completed, the value of the data item cannot yet be determined. A simple solution is to create indexes asynchronously, while the cost is that the consistency of index reading cannot be guaranteed. Therefore, the present disclosure proposes a method to achieve strongly consistent reading of non-unique indexes (for unique indexes, update operations need to be converted into read-modify-write operations, and parallel updates cannot be performed).

The primary key encoding of a non-unique index entry is: index name-index value-primary key value of the indexed data item-transaction version number, the index entry also contains non-primary key columns, and the metadata information of the index entry is recorded, which is called index metadata column. For incrementally updated data items, the index value will be set as undefined, and the value of the index metadata column is the range of the data item (the calculation method of the range is the same as in the conditional update and must be in the order of transaction timestamps); for index entry of normal records, the index value is a definite value, and the index metadata column is empty;

Use of Index:

For the query indexed_column∈C using the index, setting the timestamp of the query transaction as $TS_q$, first update the gap max reading timestamp of the query condition C∈{undefined}, then scan the index entry whose index value is not undefined, and add the index entry that meet the query conditions and transaction visibility to the result set R; then scan the index entry whose index value is undefined, first determine whether the visibility is satisfied, and if not, skip the index entry; otherwise, continue to determine relationship between the range of the index entry and the query condition set; if there is no intersection between the range of the index entry and the query condition, the data item is skipped; otherwise, if the range of the index entry is a subset of the query condition set, the index entry is added to the result set R; otherwise, a Reader object needs to be registered for the data item corresponding to the primary key of the indexed data item; the timestamp of the Reader object is set to the version number of writing the index entry, and waiting all the Writers that the Reader depends on are committed, the value of the index entry becomes a definite value, which can be compared with the query condition, and if not satisfied, it is skipped, and otherwise it is added to the result set R.

Index Cleaning:

Too many indexes with undefined value in the system will significantly slow down the query performance, so the system needs to clean up the indexes with undefined values regularly. The cleaning method is as follows:

Scan the indexes with undefined value, for each index, register a Reader object for the data item corresponding to the primary key of the indexed data item, the timestamp of which Reader object is set to the version number of the index entry, and wait for all the Writers that the Reader depends on to be committed, at this time the value of the index entry becoming a definite value; create a new index entry, using the definite value as the index value; after the creation is complete, delete the corresponding index entry with undefined value. It should be noted that in the distributed database scenario, although the two index entries here may be located on different shards, the update process does not need to rely on distributed transactions, because the failure to delete the corresponding index entry with undefined value has no influence on the correctness of the system. In the case of a deletion failure, a read transaction may read the newly created index entry and the index entry with undefined value at the same time, but the read transaction can deduplicate the result set. Also, the cleanup process is done asynchronously, so it doesn't block parallel updates.

Here is an example below,

The initial value of inventory of a store with id 1 is 10, and the inventory is constrained that the value cannot be negative, and the index idxInventory is built on the inventory column; the data type of the inventory is a 32-bit integer.

Now there are three concurrent transactions, assuming $TS(T1)<TS(T2)<TS(T3)$ and the three transactions arrive in the order of timestamp and are all auto-committed.

T1: update store set inventory=inventory−1 where id=1
T2: update store set inventory=inventory−2 where id=1
T3: update store set inventory=inventory−3 where id=1

In terms of implementation, for convenience, the maximum 32-bit integer 2147483647 can be used to represent the undefined, then:

T1 will generate an index entry idxInventory-2147483647-1-1|[9, 9]

T2 will generate an index entry idxInventory-2147483647-1-2|[7, 8]

T3 will generate an index entry idxInventory-2147483647-1-3|[4, 7]

If transaction T4 (TS(T3)<TS(T4)) executes the index query SELECT * FROM store WHERE inventory<=3 and inventory>=1, then data item 1 will not hit, because, according to visibility, [1, 3]#[4, 7]=Ø. If transaction T4 executes the index query SELECT * FROM store WHERE inventory>=0, data item 1 will hit because [4, 7]⊆[0, +∞). If transaction T4 executes the index query SELECT * FROM store WHERE inventory>=5, it is necessary to register a Reader for data item 1, which has a timestamp of TS(T3), and wait for the commit of all the Writers that the Reader depends on to further determine whether the index condition is satisfied.

Advantages of the Present Disclosure

Compared with the traditional database where all update operations must be executed serially and the time required to complete 1000 incremental update transactions is at least 1000*rtt, the present disclosure designs data records in two different formats, so that the concurrency control protocol does not have to deal with incremental write conflicts, multiple incremental update transactions can be processed in parallel, by which only 1 rtt is required to complete 1000 incremental update transactions, significantly improving the throughput and delay of the database in concurrent update scenarios, and increasing the performance in the concurrent update scenarios by thousands of times than the traditional databases.

The present disclosure ensures that the read transaction can read all write records smaller than the read transaction by maintaining the Writer→Reader dependency graph, and atomically update the timestamp of the largest transaction of the data item after all the Writers that the Reader depends on are committed, thereby guaranteeing serialization of the schedules.

The present disclosure can greatly reduce the number of edges in the dependency graph by introducing a placeholder transaction, improving processing efficiency.

The present disclosure realizes non-blocking reading by defining a new isolation level "read-continuously-committed".

The disclosure realizes parallel constraining update/conditional update by introducing domain/range iterative algorithm.

The disclosure supports parallel updates of data items with non-unique indexes.

The disclosure supports pessimistic concurrency control for read-modify-write operations by registering a placeholder writer in the read phase.

The above are only preferred embodiments of the present disclosure, and are not intended to limit the present disclosure. For those skilled in the art, the present disclosure may have various modifications and changes. Any modifications, equivalent replacements, improvements, etc. made within the spirit and principles of the present disclosure shall be included within the protection scope of the present disclosure.

The invention claimed is:

1. A database system that supports parallel updates, comprising: a concurrency control protocol, a time service, a write-ahead log module, a cache module, a persistence module, a write control module, and a read control module;
the concurrency control protocol is configured to:
at the beginning of each transaction, make control to obtain timestamp from time service as a version number of all subsequent records of the transaction;
for each data item Q that has been read in the database, cache timestamp of the largest transaction that has read the data item in memory as the max Read Timestamp;
for range queries in the database, decompose the range into disjoint intervals, and cache timestamp of the largest transaction that has read these intervals in memory as the gap max Read Timestamp; and
for each written data item in the database, cache timestamp of the largest transaction that has written the data item and timestamp of the largest transaction that has written a normal record of the data item in memory as the max Write Timestamp and the max Normal Write Timestamp, respectively;
the write-ahead log module is configured to:
record logs in such two formats as normal log and delta log, the write-ahead log must be saved to a durable medium synchronously;
the cache module is configured to:
cache the normal record with the largest version number of the data items and all subsequent delta records in the memory, and also buffer normal record and delta record written by the transaction in the cache module, and generate a Writer object corresponding to each normal record or delta record, respectively; normal records record specific and determined values, and delta records only record the incremental operation itself; incremental operations are limited to operations that can be expressed as functions that only accept this data item as an argument; update operation that cannot be expressed as functions that only accept this data item as an argument needs to be converted into read-modify-write operation and generate a normal record, and the read-modify-write operation does not support parallel updates; the cache module supports quick lookup of all cached records according to data item primary key and version number;
the persistence module is configured to:
save the records in the cache to the persistent medium asynchronously, and the persistence module also supports quick lookup of database records according to the data item primary key and the version number;
the write control module is configured to:
determine a timestamp of the transaction that writes the data item, wherein if the timestamp is smaller than the max Read Timestamp of the data item cached in memory, rollback the transaction, and otherwise perform write operations for normal write operations and incremental update operations respectively:
for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and
for the incremental update operations of the data item, further determine whether the timestamp of the transaction writing the data item is smaller than the max Normal Write Timestamp of the data item cached in the memory; if yes, rollback the transaction, and if no, update the max Write Timestamp of the data item, and generate delta logs and delta records; and
the read control module is configured to:
generate a Reader object according to the transaction reading the data item;

for the data item to be read by the transaction, obtain the last normal record cached in the memory and all subsequent delta records of which the timestamps are smaller than the transaction timestamp; if the cache misses, load the last normal record that is smaller than the transaction timestamp and all subsequent records from the persistence module into the cache;

maintain a dependency graph of the Reader object according to dependency relationship between the transaction of reading data items and the transaction of writing data items and based on the last normal record and all subsequent delta records; and execute the Reader object after execution of the Writer object corresponding to the normal record and all subsequent delta records in the dependency graph is completed; and the Reader object merges values of all the Writer objects it depends on from the dependency graph to obtain the value of the data item to be read, and atomically updates the max Read Timestamp.

2. The database system that supports parallel updates according to claim 1, wherein maintaining a dependency graph of the Reader object according to dependency relationship between the transaction of reading data items and the transaction of writing data items and based on the last normal record and all subsequent delta records comprises:

each said normal record or delta record constitutes a Writer object respectively, the Writer corresponding to the normal record is called a normal Writer, the Writer corresponding to the delta record is called an delta Writer, and value of the Writer is the corresponding normal or delta record; and all edges of the dependency graph start from a Writer object and end with a Reader object.

3. The database system that supports parallel updates according to claim 1, wherein maintaining a dependency graph of the Reader object based on the last normal record and all subsequent delta records comprises:

after the dependency graph of the Reader object is established, updating the dependency graph of the Reader object if there is arrival of a transaction to write a new data item for the data item to be read by the Reader object; and updating the dependency graph of all data items written by the transaction when a transaction written to the databases rollbacked.

4. The database system that supports parallel updates according to claim 1, wherein it further comprises a dependency graph optimization module for fusing delta records regularly and quantitatively, including:

when the transactions corresponding to the normal records of the data item and the subsequent continuous delta records have been committed, fuse all the above records and generate a new normal record; the new normal record adopts the version number of the last delta record, and updates the max Normal Write Timestamp; and at the same time, the fused record is saved to the persistence module and all previous records can be deleted from the cache.

5. The database system that supports parallel updates according to claim 1, wherein it further comprises a dependency graph optimization module, which is configured to:

after the transaction of reading data items generates a Reader object r, correspondingly generate a placeholder transaction, which placeholder transaction includes a Reader/Writer pair, wherein the Writer is a normal Writer, and make timestamp of the placeholder be the timestamp of the last Writer object smaller than r plus one; generate a dependency graph for the Reader of the placeholder transaction; subsequent transactions that read this data item and have a timestamp greater than the version number of the Reader in the placeholder transaction only need to rely on the Writer of the placeholder transaction; when execution of the Reader object corresponding to the placeholder transaction is completed, replace the value of the Writer corresponding to the placeholder transaction with the read value, and commit the placeholder transaction.

6. The database system that supports parallel updates according to claim 1, wherein it further comprises a constraining update and conditional update module;

the constraining update and conditional update module is configured to:

for update of data items with constraints, when the transaction of writing the data items is an incremental update operation, calculate a range of the data item after the current incremental update operation, and determine whether there is an intersection with the constraint range; if no intersection, it proves that the incremental update operation is illegal, and the transaction shall be rollbacked; otherwise, further determine whether it is a subset of the constraint range; if yes, it proves that the operation must be legal, and execution of the transaction is continued to complete incremental update of the data item with the constraint condition; otherwise, the operation will be converted into a read-modify-write operation, and parallel update is no longer possible; and for update of data items with conditions, when the transaction of writing the data items is an incremental update operation, calculate a domain of the data item before the current incremental update operation, and determine whether there is an intersection with the update condition; if no intersection, it proves that the incremental update operation is illegal, and the transaction shall be rollbacked; otherwise, further determine whether it is a subset of the update conditions; if yes, it proves that the operation must be legal, and execution of the transaction can be continued, and if not, the operation will be converted into a read-modify-write operation, and parallel update is no longer possible.

7. The database system that supports parallel updates according to claim 6, wherein the method for defining and updating the domain and the range includes:

assuming that the initial committed value of the data item Q is v, the range of the data item is [v, v], which is recorded as range$_Q$, and the domain is also [v, v], which is recorded as domain$_Q$;

for each incremental update operation Delta Writer w, w·f represents the function corresponding to the w update operation, then:

range$_Q$=w·f·map(domain$_Q$)

domain'$_Q$=domain$_Q$∪range$_Q$

By default, the updates of the range and domain should be performed in the order of the transaction timestamps, but if the update operation is an order-independent function and conditional incremental updates are absent, out-of-order updates can be allowed.

8. The database system that supports parallel updates according to claim 1, wherein it further comprises an index update module;

the index update module is configured to:

when there is a unique index entry on an update column of an updated data item, update operation needs to be converted into a read-modify-write operation, and parallel updates cannot be performed;

when there is a non-unique index entry on the update column of the updated data item, parallel updates can still be performed at this time, with a method of:

creating a non-unique index entry while updating a data item, which non-unique index entry comprises:

a primary key column, encoded as: index name-index value-primary key value of the indexed data item-transaction version number, wherein the index value is value of an index column, and the transaction version number is the transaction version number that creates the index; and a non-primary key column, recording metadata information of the index entry, which is called index metadata column;

for data items of incrementally records, the index value is set to be undefined, and the value of the index metadata column is the range of the data item; for index entry of normal records, the index value is a definite value, and the index metadata column is empty; and for the query using the index indexed_column∈C, setting timestamp of the query transaction as $TS_q$, first update the query condition C∪{undefined} gap max Read Timestamp; then scan the index entry whose index value is not undefined, and add the index entry that meet query conditions and transaction visibility to a result set R; then scan the index entry whose index value is undefined, first determine whether the visibility is satisfied, and if not, skip the index entry, and if yes, continue to determine relationship between the range of the index entry and the query condition set; if there is no intersection between the range of the index entry and the query condition, skip the data item, and otherwise, if the range of the index entry is a subset of the query condition set, add the index entry to the result set R, and if no, a Reader object needs to be registered for the data item corresponding to the primary key of the indexed data item; the timestamp of the Reader object is set to the version number of writing the index entry, and a read process is executed to the Reader; after the execution, the index value of the index entry is the value read by the Reader, which can be compared with the query condition; if not satisfied, skip; otherwise, add it to the result set R.

9. The database system that supports parallel updates according to claim 8, wherein the process of converting an update operation into a read-modify-write operation is as follows: first register a Reader and a placeholder Writer using the current transaction timestamp as its version number, execute the read process to obtain the value of the current data item, apply the update operation, and replace the value in the placeholder Writer with the updated value and execute the write process.

10. The database system that supports parallel updates according to claim 8, wherein the index update module is further configured to clean up indexes with undefined value, comprising:

when there are too many indexes with undefined values in the system, query performance will be significantly slowed down, and the indexes with undefined value need to be cleaned up regularly, with a method as follows:

scanning indexes with undefined value, and, for each index with undefined value, registering a Reader object for the data item corresponding to the primary key and version number of the indexed data item, and executing the Reader object, and creating a new index entry using the read value; and after the creation is completed, deleting the corresponding index entry with undefined value.

11. The database system that supports parallel updates according to claim 6, wherein the process of converting an update operation into a read-modify-write operation is as follows: first register a Reader and a placeholder Writer using the current transaction timestamp as its version number, execute the read process to obtain the value of the current data item, apply the update operation, and replace the value in the placeholder Writer with the updated value and execute the write process.

12. The database system that supports parallel updates according to claim 1, wherein the process of converting an update operation into a read-modify-write operation is as follows: first register a Reader and a placeholder Writer using the current transaction timestamp as its version number, execute the read process to obtain the value of the current data item, apply the update operation, and replace the value in the placeholder Writer with the updated value and execute the write process.

13. A method using the database system that supports parallel updates according to claim 12, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

14. A method using the database system that supports parallel updates according to claim 9, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

15. A method using the database system that supports parallel updates according to claim 8, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

16. A method using the database system that supports parallel updates according to claim 7, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

17. A method using the database system that supports parallel updates according to claim 5, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

18. A method using the database system that supports parallel updates according to claim 3, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

19. A method using the database system that supports parallel updates according to claim 2, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

20. A method using the database system that supports parallel updates according to claim 1, wherein it comprises a write transaction concurrency control method and a read transaction concurrency control method;

the write transaction concurrency control method comprises:

at the beginning of each transaction, obtaining timestamp from time service as version number of subsequent records of each transaction;

if the timestamp of the transaction is smaller than the max Read Timestamp, execute rollback, and otherwise execute write operation separately for normal write operations and incremental update operations:

for the normal write operations of the data items, further determine whether the timestamp of the transaction writing the data item is smaller than the max Write Timestamp of the data item cached in the memory; if yes, rollback the transaction, and if no, update the max Write Timestamp and the max Normal Write Timestamp, and generate normal logs and normal records; and for the incremental update operations of the data item, further determine whether the timestamp of the transaction writing the data item is smaller than the max Normal Write Timestamp of the data item cached in the memory; if yes, rollback the transaction; and if no, update the max Write Timestamp of the data item, and generate delta logs and delta records; and the read transaction concurrency control method comprises:

at the beginning of each transaction, obtaining timestamp from time service as version number of subsequent records of each transaction;

generating a Reader object for each data item read by the transaction;

for each data item to be read by the transaction, obtaining the last normal record and all subsequent delta records cached in memory that are smaller than the corresponding transaction timestamp; if the cache misses, load the last normal record that is smaller than the transaction timestamp and all subsequent records from the persistence module into the cache;

maintaining a dependency graph of the Reader object according to dependency relationship between the transaction of reading data items and the transaction of writing data items and based on the last normal record and all subsequent delta records;

executing the Reader object when the last normal record and all subsequent delta records in the dependency graph are committed; and obtaining the value of the data item to be read by the Reader object by merging from the dependency graph with values of all the Writer objects it depends on, and atomically updating the max Read Timestamp.

* * * * *